United States Patent Office 3,676,167

Patented July 11, 1972

1

3,676,167

RUTILE TITANIUM DIOXIDE PIGMENT FOR PAPER LAMINATES

Alfred John Werner, Newport, Del., assignor to E. I. du Pont de Nemours and Company, Wilmington, Del.

No Drawing. Filed Aug. 14, 1970, Ser. No. 63,922
Int. Cl. C09c 1/36
U.S. Cl. 106—300 2 Claims

ABSTRACT OF THE DISCLOSURE

In a process of treating rutile titanium dioxide pigment by (a) mixing titanium dioxide and a silicate in water forming a slurry; (b) neutralizing the slurry to obtain a pH value of about 5–8, at a temperature of about 50–70° C.; (c) adding a soluble zinc salt to the mixture and adjusting the pH of the mixture to a level of about 6.5–7.5; (d) isolating the treated pigment from the mixture; (e) calcining the isolated pigment; and (f) dry-grinding the calcined pigment, the light stability of the pigment and the ability of the pigment to be retained by paper pulp in the manufacture of paper is improved by rapidly adding sulfuric acid having a concentration of 50–96 percent to the slurry of pigment and silicate, reducing the pH of the slurry to a value of 5 or less and effecting rapid precipitation of silica.

BACKGROUND OF THE INVENTION

This invention relates to a process of treating rutile titanium dioxide pigment to improve its light stability and its ability to be retained by paper pulp in the manufacture of paper.

It is well known that in the manufacture of paper, pigment can be added to improve the opacity and brightness of the finished paper. Where the paper is to be used in the uncoated form for printing and stationery use, small amounts of anatase titanium dioxide pigment are sufficient to obtain the desired opacity in the paper. However, when paper for decorative overlays in paper laminates is desired, the laminating process coats the pigment particles with synthetic resin which considerably reduces the opacity of the paper sheet, compared to that exhibited by the paper sheet in the unresined condition. Therefore, the higher refractive indexed rutile form of titanium dioxide is needed to confer the desired opacity to the paper.

In the preparation of pigmented paper sheets, the pigment is added to the aqueous slurry of paper pulp. Alum is thereafter added to flocculate the pigment. The paper sheet is then formed by dewatering the pulp slurry on the wire screen of a Fourdrinier. During the dewatering process, a considerable quantity of pigment, i.e. up to 80% escapes with the water. This creates problems in that the pigment lost from the process must be recovered and reused in order to make the process economical. However, recovery is not easy because the pigment must be recovered from a large volume of water which also contains contaminants. In addition, recovery of pigment is desired in order to avoid pollution problems that can result if the water is discharged to an open stream.

U.S. Pat. No. 3,503,772 discloses a process of treating rutile titanium dioxide pigment to improve its light stability and its ability to be retained in paper pulp during the manufacture of paper. The light stability is improved by incorporating a water-soluble silicate in a slurry suspension of a titanium dioxide pigment while maintaining the slurry at a pH below 8, during the addition of the last and major portion of said silicate maintaining the pH of said slurry between 5 and 8, incorporating a soluble zinc salt in said slurry after incorporation of said silicate and

2 adjusting the pH of the slurry to within a range of 6.5 to 7.5, employing in such pigment treatment an amount of silicate and zinc salt sufficient to coat the final pigment with the equivalent of from 2 to 25 weight percent $SiO_2$ and 0.1 to 3.0 weight percent ZnO based on the weight of $TiO_2$ present, filtering and washing the treated pigment and the calcining of it at a temperature between 300 and 850° C. Although the light stability of the pigment is improved, it is unduly sensitive and adversely affected by calcination.

The ability of the pigment to be retained by the paper pulp is improved by dry-milling the pigment in the presence of an alkali metal carboxymethyl-cellulose. This (is uneconomical because it) adds an extra step to the process of preparing rutile titanium dioxide for use in manufacturing paper and requires the use of an additional expensive coating compound, namely the alkali metal carboxymethyl-cellulose thereby unnecessarily increasing the cost of preparing the pigment.

SUMMARY OF THE INVENTION

Accordingly, this invention provides an economical process for preparing an improved rutile titanium dioxide pigment that has improved light stability during calcination and an improved ability to be retained by paper pulp during the process of manufacturing paper.

The improved process is carried out by:

(a) mixing rutile titanium dioxide pigment in water in the amount of 300–500 grams of pigment per liter of water, forming a slurry,
(b) adding a sodium silicate to the slurry in the amount of about 1–10 weight percent $SiO_2$ based on the weight of pigment in the slurry, and neutralizing the slurry to obtain a pH of about 5–8 while maintaining a temperature of about 50–70° C.,
(c) adding an acid-soluble zinc salt to the slurry in an amount equivalent to 0.5–3 percent of zinc oxide based on the weight of pigment in the slurry,
(d) adjusting the pH of the slurry to a value of 6.5–7.5,
(e) isolating the treated pigment from the slurry,
(f) calcining the isolated pigment at a temperature in the range of about 500–700° C., and
(g) dry-grinding the calcined pigment, wherein the improvement consists essentially of agitating the slurry of rutile titanium dioxide pigment and silicate in the water while adding sulfuric acid having a concentration of from 50–96 percent to the slurry to reduce the pH of the slurry to a value of 5 or less, over a period of time not exceeding 20 minutes, effecting rapid precipitation of silica.

DETAILS OF THE INVENTION

This invention is useful with rutile titanium dioxide pigment. The pigment can be produced by the high temperature vapor phase oxidation of titanium tetrachloride that can contain up to 5 percent $Al_2O_3$ derived from the cooxidation of aluminum chloride. The pigment from the oxidation reactor is slurried in water in the amount of about 300–500 grams of pigment per liter of water. These values represent practical limitations in slurrying titanium dioxide pigment. The slurry is initially acid due to the adsorbed hydrogen chloride on the pigment particles, and the slurry is at an initial temperature of 50–60° C. due to the residual heat contained in the pigment particles as they exit the pigment-forming oxidation reactor. If necessary, the slurry can be heated to raise and maintain the temperature to 50–70° C. during further treatment of the pigment. Sodium silicate is added to the slurry in an amount equivalent to about 1–10 weight percent silicon dioxide, and preferably to 2–5 weight percent, based on the weight of pigment contained in the slurry. The addition of sodium silicate raises the pH of the slurry to a value above 9.

The improvement provided by this invention consists essentially of rapidly adding to this alkaline slurry, concentrated acid such as sulfuric acid having a concentration of about 50–96 percent, within a period of time not exceeding 20 minutes, and preferably less than 10 minutes, in an amount sufficient to reduce the pH to a value below 5.

A soluble zinc salt is then added to the slurry in an amount equivalent to 0.5–3 weight percent of zinc oxide based on the weight of pigment present in the slurry. The zinc salt is mixed into the slurry and a soluble base, such as sodium hydroxide, is added to raise the pH of the slurry to a value of 7–7.5. The slurry is permitted to cure by setting for a period of time, about 15–30 minutes, for digestion. Thereafter, the pigment is removed from the slurry by conventional techniques, such as filtering. The pigment is thereafter washed and calcined at a temperature within the range of about 500–700° C. The calcined pigment is then dry-ground by conventional techniques, such as a fluid energized milling device.

Electron micrographs of pigment prepared by this invention, wherein silicon dioxide is rapidly precipitated from the slurry of titanium dioxide and silicate in water by the rapid addition of acid, have a very fluffy surface coating of silica. In contrast, pigments prepared by slowly precipitating the silicon dioxide have a much denser coating of silica on the surface.

An alternate embodiment to this invention involves the addition of a soluble aluminum salt to the slurry in an amount equivalent to about 0.1 to 2.0 weight percent $Al_2O_3$ based on the weight of titanium dioxide after the addition of the zinc salt and prior to the addition of the sodium hydroxide. This effects the precipitation of hydrous alumina and results in a pigment which is easier to filter and wash without adversely affecting either the light stability or the retentiveness of the pigment in paper pulp.

An advantage of the present invention is that it provides an economical process of treating titanium dioxide pigment to improve the ability of the pigment to be retained by paper pulp in the manufacture of paper. Another advantage is that pigment prepared by the present invention has a reduced sensitivity to light. It has been observed that the presence of soluble salts on silica-zinc coated pigment causes the light stability of such pigment to be unduly sensitive to calcination. However, when rapid precipition of silica dioxide is employed according to the present invention, this sensitivity to calcination is greatly reduced. Ths reduced sensitivity has the additional advantage of eliminating the necessity of thoroughly washing pigment intended for wet-end paper use.

The following examples illustrate this invention. All parts, percentages and proportions are by weight unless otherwise indicated.

The following tests are used in the examples to evaluate pigment retention and light stability.

(1) Pigment retention test

Two grams of the titanium dioxide sample to be evaluated, 5.20 grams of dry, unbeaten paper pulp, and 600 ml. distilled water are mixed at high speed for 5 minutes in a macerating type laboratory blender. Alum is added to the mixture with mixing continuing for about 1 minute. Two separate tests are run using 2 different levels of alum content, namely (1) .3 cc. of a 10% alum solution or .6 weight percent alum based on pulp weight, and (2) .3 cc. of a 50% alum solution or 3 weight percent alum based on pulp weight. The pulp-pigment slurry is then added to the deckle box of a Noble and Wood laboratory paper machine containing 9.3 liters of water, the pH adjusted to 6.5 for the test incorporating alum at the 0.6 weight percent level and 5.5 for the test incorporating alum at the 3 weight percent level and, after agitation, suction is applied to remove water and form an 8" x 8" sheet on the screen. The sheet thus formed is dried between sheets of blotting paper on a drum drier. Part of the sheet is used for retention tests and part retained for light stability testing in laminates.

A portion of the $TiO_2$-containing sheet is oven-dried, weighed, ashed at 800° C., for 2 hours, and the ashed weight determined. After subtracting the amount of ash furnished by the pulp and correcting for the ignition loss of the pigment, the resultant weight is divided by the initial weight of $TiO_2$ originally added to the pulp prior to sheet formation to give the percent pigment retention.

(2) Light stability test

A portion of the $TiO_2$-containing sheet prepared by the method described in the Pigment Retention Test, is processed into a paper laminate and tested for light stability by the following method: After drum-drying, the paper sample is soaked in a water solution of melamine formaldehyde resin, the excess solution removed by drawing the sample over a glass rod, and the sample is allowed to air dry. After curing in a circulating oven at 110° C. for seven minutes, two strips are cut from the sample and, along with another strip prepared similarly using a control pigment, are processed into laminate form by underlaying the three strips with a multiplicity of sheets of kraft paper saturated with a phenolic resin. The resulting laminate construction is then pressed at 100 p.s.i. between plates heated to 300° F. for six minutes, and cooled under pressure.

A portion of the upper surface of the laminate, which is comprised of the three strips of test paper, is masked at the edge with aluminum foil in such a manner that one-third of each of the strips is covered. The laminate is then exposed to light in a Fade-Ometer (Atlas Electrical Corp., Chicago, Ill.) for 48 hours. The degree of discoloration is then evaluated by visually comparing the exposed portions of the samples with the unexposed portions, and the samples containing the experimental pigment are rated with respect to the sample containing the control pigment. The control pigment is usually that pigment which is most widely used in the industry because of its resistance to discoloration when incorporated in paper laminates.

EXAMPLE 1

Rutile titanium dioxide pigment produced by the vapor phase oxidation of $TiCl_4$ and containing about 1 weight percent of cooxidized $Al_2O_3$, is mixed with water in the amount of about 400 grams of pigment per liter of water forming a slurry. The slurry is agitated and heated to 60° C. A 200-gram sodium silicate solution is added to the slurry in an amount sufficient to supply the slurry with 2 weight percent silicon dioxide. While the slurry is being agitated, 50% concentrated sulfuric acid is continuously added for 5 minutes to adjust the pH to 5. A zinc sulfate solution providing 100 grams of ZnO per liter of water is added to the slurry in an amount equivalent to 1 weight percent ZnO based on the weight of titanium dioxide. The slurry is digested for one hour with agitation. An alum solution providing 100 grams per liter of $Al_2O_3$ is added to the slurry in an amount sufficient to provide 0.4 weight percent $Al_2O_3$ based on the weight of titanium dioxide in the slurry. A 50% concentrated solution of NaOH is added to adjust the pH to 7.2. The slurry is allowed to digest for 30 minutes. The slurry is then filtered to isolate the pigment and the isolated pigment is then washed, calcined for one hour at 560° C., and milled on a fluid energized mill.

For comparison, a control pigment is prepared according to a closely related, presently used, commercial process. Rutile titanium dioxide pigment, produced by the vapor phase oxidation of $TiCl_4$ and containing about one weight percent of cooxidized $Al_2O_3$ is mixed with water in the amount of about 400 grams of pigment per liter of water forming a slurry. The slurry is agitated and heated to 60° C. Commercial sodium silicate containing 200 grams per liter $SiO_2$ is added slowly in an amount equal to 2% $SiO_2$ based on the $TiO_2$, while simultaneously adding 10% sulfuric acid at a rate sufficient to keep the pH of the slurry at 6±0.5. After 45 minutes of agitation at 60° C., zinc sulfate solution, 100 grams per liter ZnO) is added in an amount equivalent to 1% ZnO based on the $TiO_4$. After stirring and digestion for one hour, sufficient NaOH is added to raise the pH to 7.2. The slurry is filtered, washed, calcined for one hour at 560° C., and milled on a fluid energy mill.

Both pigments are incorporated into paper pulp and made into hand sheets. Part of each sheet is used to determine percent $TiO_2$ retention and the remaining portions are made into paper laminates and tested for light stability. The comparative results are shown below.

| | Control | Example 1 |
|---|---|---|
| Pigment retention: | | |
| 0.6 weight percent alum level | 27 | 70 |
| 3.0 weight percent alum level | 60.1 | 61.5 |
| Light stability | (1) | (2) |

[1] Standard.
[2] Better than standard for both levels of alum content.

This illustrates that the pigment prepared by the present invention has a significantly improved retentive power in paper pulp with the alum content of the paper pulp at a low level, i.e. 0.6 weight percent and that it is a little better than the control at the higher level of alum content, i.e. 3.0 weight percent. In addition, the light stability of the pigment in the paper is better than the standard at both levels of alum content.

What is claimed is:

1. In a process of treating rutile titanium dioxide pigment by:

(a) mixing rutile titanium dioxide pigment in water in the amount of 300–500 grams of pigment per liter of water, forming a slurry, (b) while maintaining the slurry at a temperautre of about 50–70° C. adding a sodium silicate thereto in an amount equivalent to about 1–10 percent $SiO_2$, based on the weight of pigment, and effecting precipitation of the $SiO_2$, (c) adding an acid-soluble zinc salt to the slurry in an amount equivalent to 0.5–3 percent of zinc oxide based on the weight of pigment in the slurry, (d) adjusting the pH of the slurry to a value of 6.5–7.5, (e) isolating the treated pigment from the slurry, (f) calcining the isolated pigment at a temperature in the range of about 500–700° C., and (g) dry-grinding the calcined pigment, the improvement which consists essentially of effecting step (b) by agitating the slurry of rutile titanium dioxide pigment while adding the silicate thereto to provide a pH above 9 and thereafter rapidly precipitating the $SiO_2$ by adding sulfuric acid over a period of time not exceeding 20 minutes, said sulfuric acid having a concentration of from 50 to 96 percent and being added in an amount to reduce the pH of the slurry to a value of 5 or less.

2. The process of claim 1 wherein the solution of sodium silicate is added in an amount equivalent to 2–5 weight percent $SiO_2$ based on the weight of pigment present.

References Cited

UNITED STATES PATENTS

| | | | |
|---|---|---|---|
| 3,503,772 | 3/1970 | Fields | 106—300 |
| 3,410,708 | 11/1968 | McGinnis | 106—300 |

JAMES E. POER, Primary Examiner

U.S. Cl. X.R.

106—308 B